United States Patent
Abe et al.

(10) Patent No.: US 11,902,795 B2
(45) Date of Patent: Feb. 13, 2024

(54) LINE CONTROL DEVICE, LINE CONTROL METHOD, AND LINE CONTROL PROGRAM

(71) Applicant: NIPPON TELEGRAPH AND TELEPHONE CORPORATION, Tokyo (JP)

(72) Inventors: Junichi Abe, Musashino (JP); Daisuke Goto, Musashino (JP); Izumi Urata, Musashino (JP); Koichi Harada, Musashino (JP); Fumihiro Yamashita, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 108 days.

(21) Appl. No.: 16/975,475

(22) PCT Filed: Feb. 12, 2019

(86) PCT No.: PCT/JP2019/004889
§ 371 (c)(1),
(2) Date: Aug. 25, 2020

(87) PCT Pub. No.: WO2019/167606
PCT Pub. Date: Sep. 6, 2019

(65) Prior Publication Data
US 2021/0022010 A1      Jan. 21, 2021

(30) Foreign Application Priority Data

Feb. 27, 2018   (JP) ................................. 2018-033588

(51) Int. Cl.
*H04W 16/14*      (2009.01)
*H04W 76/36*      (2018.01)
(Continued)

(52) U.S. Cl.
CPC ............. *H04W 16/14* (2013.01); *H04L 27/26* (2013.01); *H04W 72/0453* (2013.01); *H04W 76/36* (2018.02)

(58) Field of Classification Search
CPC ..... H04W 16/14; H04W 76/36; H04W 72/04; H04L 27/26
See application file for complete search history.

(56) References Cited

U.S. PATENT DOCUMENTS

2007/0042733 A1   2/2007  Tomioka
2017/0257774 A1*  9/2017  Ghosh ................... H04W 16/14
(Continued)

FOREIGN PATENT DOCUMENTS

| JP | 200753546 A | 3/2007 |
| JP | 201280312 A | 4/2012 |
| JP | 5483472 B2  | 5/2014 |

OTHER PUBLICATIONS

J. Abe et al. "Experimental Verification of Blind Phase Compensation Scheme in Bandwidth Distributed Transmission." Science and Technology News. vol. 111, No. 336. (2011): pp. 41-46. Machine translation attached.
(Continued)

*Primary Examiner* — Huy D Vu
*Assistant Examiner* — Robert Ma
(74) *Attorney, Agent, or Firm* — Harness, Dickey & Pierce, P.L.C.

(57) ABSTRACT

In a line control apparatus including a shared band in which first and second frequency bands used by first and second wireless communication systems, respectively, overlap with each other and allocating the first and second frequency bands including the shared band to terminal stations of the respective wireless communication systems, the line control apparatus includes a control unit configured to identify a use status of the first and second frequency bands, and release an (Continued)

allocated band of a terminal station of the second wireless communication system, the terminal station being a minimum terminal station necessary, in a case where a terminal station of the first wireless communication system performs a new band allocation request, and a requested band by the first wireless communication system is not secured due to allocation of the shared band to the terminal station of the second wireless communication system, until the requested band is secured.

7 Claims, 13 Drawing Sheets

(51) Int. Cl.
*H04L 27/26* (2006.01)
*H04W 72/0453* (2023.01)

(56) References Cited

U.S. PATENT DOCUMENTS

2017/0332266 A1\* 11/2017 Futaki .................. H04W 88/10
2018/0199341 A1\* 7/2018 Baldemair .......... H04L 27/0008

OTHER PUBLICATIONS

J. Abe et al. "Bandwidth dispersion transmission technology for improving frequency utilization efficiency of satellite communications." NTT Technical Journal. vol. 24. No. 3 (2012), pp. 55-57. Machine translation attached.

Mashino et al. "Experimental Evaluation of Autologous Spectrum Regenerating Equalization for Supressed Transmission." Technical Research Report by the Institute of Electronics, Information and Communication Engineers. vol. 113, No. 193. (2013): pp. 31-36. Machine translation attached.

\* cited by examiner (a) MODULATION SIGNAL BEFORE DIVISION AND COMPRESSION

↓ DIVISION (b) SUB-MODULATION SIGNAL AFTER DIVISION AND COMPRESSION

↓ DISTRIBUTION (c) SUB-MODULATION SIGNAL AFTER DISTRIBUTION

LINE CONTROL DEVICE, LINE CONTROL METHOD, AND LINE CONTROL PROGRAM

CROSS-REFERENCE TO RELATED APPLICATIONS

This application is a 371 U.S. National Phase of International Application No. PCT/JP2019/004889, filed on Feb. 12, 2019, which claims priority to Japanese Application No. 2018-033588, filed on Feb. 27, 2018. The entire disclosures of the above applications are incorporated herein by reference.

TECHNICAL FIELD

The present disclosure relates to a line control apparatus, a line control method, and a line control program capable of including a shared band in which a first frequency band used by a first wireless communication system and a second frequency band used by a second wireless communication system overlap with each other and performing control to preferentially allocate continuous bands to a terminal station of the first wireless communication system when allocating the shared band to a terminal station belonging to each wireless communication system.

BACKGROUND ART

FIGS. 7A and 7B illustrate a configuration of a wireless communication system using a communication satellite as a relay station.

In FIG. 7A, a terminal station and a base station are connected via the relay station (the communication satellite). The solid line indicates a communication line, and the broken line indicates a control line. A line control apparatus installed in the base station is configured to identify a use status of a frequency band of the communication line, and performs allocating and releasing the frequency band of the communication line to each terminal station via the control line. At this time, a line control management terminal for configuring a parameter such as band allocation of the line control apparatus may be disposed in the base station. As illustrated in FIG. 7B, a configuration may be provided in which the same functions as those of the line control apparatus of the base station are disposed in another line control station separate from the base station. At this time, the line control management terminal may be disposed on the line control station.

FIG. 8 illustrates a configuration of a wireless communication system using a base station as a relay station.

In FIG. 8, in each cell, a frequency band is allocated to a terminal station from a line control apparatus installed in the base station. In the wireless communication system in which cells, such as a macro cell and a micro cell, are superimposed, the line control apparatuses operate in cooperation between the superimposed cells.

In such a wireless communication system, total bandwidth of communication lines allocated to each terminal station are limited to a system bandwidth or less to be used by the relay station. In a demand allocation method which is used to effectively utilize the system bandwidth, a line is dynamically allocated to a terminal station which starts communication, and the line is released when the communication ends. However, each terminal station asynchronously repeats line allocation and line release, creating a plurality of discontinuous open bands on the system band.

"Spectrum division transmission" is used in which a single-carrier modulation signal is divided into a plurality of sub-modulation signals on a transmission side, each sub-modulation signal is distributed in an unused band, and the signal is restored to an original modulation signal of continuous band on the reception side (Patent Literature 1 and Non Patent Literature 1).

FIGS. 9A and 9B illustrate an example of a configuration of a transmission apparatus and a reception apparatus which perform spectrum division transmission. FIG. 9A illustrates the transmission apparatus and FIG. 9B illustrates the reception apparatus.

In FIG. 9A, the transmission apparatus includes a modulator 101, a transmission filter bank 20, and an RF apparatus 103. Transmission data is modulated with a modulation scheme such as QPSK at the modulator 101 and is input to the transmission filter bank 20 as a single-carrier modulation signal.

The transmission filter bank 20 includes a Fourier transform (FFT) circuit 22, division filters 231 to 23n (n is an integer equal to or more than two), frequency shifters 241 to 24n, an addition circuit 25, and an inverse Fourier transform (IFFT) circuit 26, and is configured to divide a band of the single-carrier modulation signal into n and distribute and transmit the signal on a frequency axis. An example of four divisions (n=4) of a band of the single-carrier modulation signal is illustrated in FIGS. 10A to 10C (Non Patent Literature 2).

A single-carrier modulation signal input to the transmission filter bank 20 is subjected to Fourier-transformation in the FFT circuit 22 and is converted from a signal in a time domain to a signal in a frequency domain. The division filters $23_1$ to $23_4$ multiply the single-carrier modulation signal converted into the frequency domain by a filter coefficient for dividing a signal band into four bands indicated by the dashed line in FIG. 10A and for each frequency, generate four sub-modulation signals 1 to 4 illustrated in FIG. 10B. The frequency shifters $24_1$ to $24_4$ distribute each sub-modulation signal in a desired band on the frequency axis and the addition circuit 25 creates a sum of the sub-modulation signals to generate distributed sub-modulation signals 1 to 4 as illustrated in FIG. 10C. The sub-modulation signals 1 to 4 after this division are converted from the signal in the frequency domain to the signal in the time domain by inverse Fourier transform in the IFFT circuit 26, and are transmitted from the RF apparatus 103.

In FIG. 9B, the reception apparatus includes an RF apparatus 201, a reception filter bank 30, and a demodulator 203. A reception signal is received and processed by the RF apparatus 201 and input to the reception filter bank 30.

The reception filter bank 30 includes an FFT circuit 32, extraction filters $33_1$ to 33n, frequency shifters 34 to 34n, an addition circuit 35, and an IFFT circuit 36, and is configured to synthesize the sub-modulation signal for which the band is divided into n to the single-carrier modulation signal before division. FIGS. 10D to 10F illustrate an example of synthesis of the single-carrier modulation signal for which the band is divided into four (n=4) (Non Patent Literature 2).

The reception signal input to the reception filter bank 30 is subjected to Fourier-transform in the FFT circuit 32 and is converted from a signal in the time domain to a reception signal in the frequency domain. The extraction filters $33_1$ to $33_4$ multiply the reception signal converted into the frequency domain by the filter coefficient and extracts sub-modulation signals 1 to 4 which have been frequency-shifted on the transmission side as illustrated in FIG. 10D. As illustrated in FIG. 10E, the frequency shifters $34_1$ to $34_4$ return the extracted sub-modulation signals 1 to 4 back to the band before the frequency shift on the transmission side and the addition circuit 35 creates a sum of the signals to generate synthesized modulation signal illustrated in FIG. 10F. The modulation signal after this synthesis is converted from a signal in the frequency domain into a signal in the time domain by inverse Fourier transform in the IFFT circuit 36 and is output. The demodulator 203 demodulates the single-carrier modulation signal output from the reception filter bank 30 and restores the reception data.

By using such a transmission apparatus and a reception apparatus, each sub-modulation signal generated by dividing an unshared band of the single-carrier modulation signal can be distributed at a predetermined location on the frequency axis. Thus discontinuous unused bands can be effectively used by a plurality of different users.

In the spectrum division transmission, "spectrum suppression transmission" can be performed, in which a plurality of sub-modulation signals are partially omitted and transmitted, and the sub-modulation signal omitted is regenerated on the reception side (Non Patent Literature 3). For example, as illustrated in FIG. 11, some of the sub-modulation signals can be omitted by invalidating or setting the filter coefficient to zero on some of the division filters $23_1$ to $23_n$ illustrated in FIG. 9A. In the example illustrated in FIG. 11, among the division filters $23_1$ to $23_4$, the division filter $23_4$ is invalidated and the corresponding sub-modulation signal 4 is omitted.

On the reception side, the omitted sub-modulation signal 4 is regenerated, and the received sub-modulation signals 1 to 3 are synthesized with the received sub-modulation signal 4 to demodulate the restored single-carrier modulation signal. This process is clearly described, for example, in Non Patent Literature 3, and is performed as follows. A compressed reception signal is demodulated, and a bit string is generated through correcting a code error by an error correction code, the code error being due to inter-symbol interference (distortion) caused by compression. Thereafter, the generated bit string is remodulated, and a modulation signal (a transmission signal replica) close to the modulation signal that has been generated before compression on the transmission side is generated. Then, a spectrum (a subspectrum replica) of the part compressed on the transmission side is extracted (regenerated). A reception characteristic is improved by synthesizing and demodulating the sub-spectrum replica regenerated on the reception side and the compressed reception signal.

A ratio between a symbol rate of the modulation signal before spectrum compression and a band within the symbol rate reduced by the spectrum compression is defined as a compression rate (=band within reduced symbol rate/symbol rate). For example, in FIG. 11, a band of one sub-modulation signal is deleted among the four equal divisions, the compression rate is ¼.

FIG. 12 illustrates an example of a configuration of a line control apparatus of a base station or a line control station.

In FIG. 12, the base station or the line control station includes a control line transmission and reception unit 311 connected to a control line, an access control unit 312 as a line control apparatus, a terminal management DB unit 313, a line management DB unit 314, and a line allocation processing unit 315. Here, a standard configuration of the base station or the line control station is omitted.

The terminal management DB unit 313 holds information related to a modulation scheme, a coding scheme, a coding rate, and a maximum transmission power of each terminal station. In the entire band to be controlled, the line management DB unit 314 holds information related to a location of an open band, an allocation band and a modulation scheme of a terminal station during operation, a coding scheme, a coding rate, the number of divisions, a compression rate, a sub-modulation signal to be compressed, a transmission power, a power to be transmitted by a relay station or a base station. An ID is allocated to each terminal station, and each DB unit manages each information by using the terminal station ID as a key.

The control line transmission and reception unit 311 which receives an allocation request signal from the terminal station outputs a demodulation signal to the access control unit 312. The access control unit 312 extracts a terminal station ID and a request bit rate from the demodulation signal and notifies the line allocation processing unit 315. The line allocation processing unit 315 references the terminal management DB unit 313 and the line management DB unit 314 for the request bit rate from the terminal station, generates a candidate for a modulation scheme for the terminal station or the base station, a coding scheme, the number of divisions, a compression rate, a sub-modulation signal to be deleted, and a center frequency of each sub-modulation signal, and selects an optimal allocation method. The access control unit 312 reflects a processing result of the line allocation processing unit 315 as line control information to the line management DB unit 314, and transmits the result to the base station and the terminal station by using wiring in the base station or the control line. Thus, spectral efficiency is improved, and high-speed communication is realized.

On the other hand, when the communication ends in the terminal station, using the control line, a line open signal to which a terminal station ID is appended is transmitted to the base station or the line control apparatus of the line control station. In the line control apparatus, when the control line transmission and reception unit 311 receives the line open signal, the access control unit 312 reads the terminal station ID, and deletes contents of the allocated line from the line management DB unit 314.

CITATION LIST

Patent Literature

Patent Literature 1: JP 5483472
Patent Literature 2: JP 2007 053546 A

Non Patent Literature

Non Patent Literature 1: Abe, Nakahira, Sugiyama: "Experimental Evaluation of Blind Phase Compensation Scheme for Direct Spectrum Division Transmission", IEICE Technical Report, vol. 111, no. 336, SAT2011-46, pp. 41 to 46, December 2011

Non Patent Literature 2: "Spectrum Division Transmission Scheme for Higher Frequency Utilization Efficiency of Satellite Communication", NTT Technical Journal, 2012 Vol. 24 No. 3, pp. 55 to 57

Non Patent Literature 3: Masuno, Abe, Sugiyama: "Experimental Evaluation of Autologous Spectrum Regenerating Equalization for Spectrum Suppressed Transmission". IEICE Technical Report, SAT, Satellite Communication 113 (193), 31 to 36. 2013-08-22

SUMMARY OF THE INVENTION

Technical Problem

In the spectrum division transmission. Patent Literature 1 discloses that an unused band can be effectively used in a frequency domain managed by a line control apparatus illustrated in FIG. 12. In a situation in which a frequency resource shortage is imminent, if the unused bands in the frequency band managed by the existing (operating) wireless communication system can be consolidated and used by the spectrum division transmission, improvement of spectral efficiency can be expected.

Meanwhile, in Patent Literature 1, in a case where an existing wireless communication system to which continuous bands are allocated and a wireless communication system which performs spectrum division transmission share an identical frequency band, it is not assumed that the wireless communication system which performs the spectrum division transmission uses the unused band without lowering operation efficiency or affecting operability of the existing wireless communication system. That is, for example, when all the terminal stations of the existing wireless communication system are used at all times, in a case where 100% of frequency bands of the system is used, the terminal station of the existing wireless communication system is operated on the assumption that band allocation is always granted. Under this assumption, after the unused band is allocated to the terminal station which performs the spectrum division transmission, the continuous bands cannot be secured in a case where there is a band allocation request from the terminal station of the existing wireless communication system, and a situation in which the band to be normally allocated cannot be allocated occurs.

Here, the existing wireless communication system to which the continuous bands are allocated is referred to as a "primary system", and the wireless communication system which performs the spectrum division transmission is referred to as a "secondary system". As illustrated in FIG. 13A, the primary system and the secondary system may share one or more identical frequency bands with each other, and as illustrated in FIG. 13B, frequency bands having different bandwidths may be allocated to each. In this case, the primary system and the secondary system may have a shared band and respective unshared bands.

In a case of FIG. 13A, when the secondary system uses an unused band, there may be an effect that continuous bands cannot be allocated to the primary system. In a case of FIG. 13B, when only the unshared band is allocated to the secondary system, this does not affect the existing system, but when a shared band is allocated to the secondary system, the primary system is affected.

In cognitive wireless technology described in Patent Literature 2 or the like, in which an unused band of an existing system is employed for auxiliary use, a use status of bands of the existing system is identified by sensing, but it is difficult to eliminate interference with the existing system without adding a change to apparatuses in the existing system.

An object of the present disclosure is to provide a line control apparatus, a line control method, and a line control program capable of identifying an overall use status of frequency bands used by a primary system and a secondary system and realizing a comprehensive line control in which the primary system can preferentially use the frequency band and the secondary system secondarily uses an unused band.

Means for Solving the Problem

According to a first aspect of the present disclosure, there is provided a line control apparatus including a shared band in which a first frequency band used by a first wireless communication system and a second frequency band used by a second wireless communication system overlap with each other and allocating the first frequency band and the second frequency band including the shared band to terminal stations of the respective wireless communication systems, the line control apparatus comprising: a control unit configured to identify a use status of the first frequency band and the second frequency band, and release an allocated band of a terminal station of the second wireless communication system, the terminal station being a minimum terminal station necessary, in a case where a terminal station of the first wireless communication system performs a new band allocation request, and a requested band by the first wireless communication system is not secured due to allocation of the shared band to the terminal station of the second wireless communication system, until the requested band is secured.

In the line control apparatus according to the first aspect of the present disclosure, when the control unit release the allocated band of the terminal station of the second wireless communication system, in a case where an unused band of the second frequency band is secured, the control unit performs control to shift band allocation to the unused band and release the allocated band, and in a case where no unused band of the second frequency band is secured, the control unit performs control of line disconnection.

In the line control apparatus according to the first aspect of the present disclosure, the second wireless communication system is configured to perform spectrum division of dividing a single-carrier modulation signal into one or more sub-modulation signals and distributing the one or more sub-modulation signals in one or more unused bands, and when the control unit release the allocated band of the terminal station of the second wireless communication system, in a case where an unused band of the second frequency band is secured by the spectrum division, the control unit performs control to shift band allocation to the unused band and release the allocated band, and in a case where no unused band of the second frequency band is secured by the spectrum division, the control unit performs control of line disconnection.

According to a second aspect of the present disclosure, there is provided a line control method which includes a shared band in which a first frequency band used by a first wireless communication system and a second frequency band used by a second wireless communication system overlap with each other and for allocating the first frequency band and the second frequency band including the shared band to terminal stations of the respective wireless communication systems, the line control method comprising: performing of identification of a use status of the first frequency band and the second frequency band, and release of an allocated band of a terminal station of the second wireless communication system, the terminal station being a minimum terminal station necessary, in a case where a terminal station of the first wireless communication system performs a new band allocation request, and a requested band by the first wireless communication system is not secured due to allocation of the shared band to the terminal station of the second wireless communication system, until the requested band is secured.

In the line control method according to the second aspect, when the control unit releases the allocated band of the terminal station of the second wireless communication system, the terminal station being a minimum terminal station necessary, in a case where an unused band of the second frequency band is secured, control of shifting band allocation to the unused band and releasing the allocated band is performed, and in a case where no unused band of the second frequency band is secured, control of line disconnection is performed.

In the line control method according to the second aspect, the second wireless communication system is configured to perform spectrum division of dividing a single-carrier modulation signal into one or more sub-modulation signals and distributing the one or more sub-modulation signals in one or more unused bands, and when the control unit release the allocated band of the terminal station of the second wireless communication system, the terminal station being a minimum terminal station necessary, in a case where an unused band of the second frequency band is secured by the spectrum division, control of shifting band allocation to the unused band and releasing the allocated band is performed, and in a case where no unused band of the second frequency band is secured by the spectrum division, control of line disconnection is performed.

According to a third aspect of the present disclosure, there is provided a line control program for causing a computer to execute a process performed by the line control apparatus described in the first aspect, wherein the process includes, when a terminal station of the first wireless communication system performs a new band allocation request, performing control of releasing the shared allocated band of the terminal station of the second wireless communication system until a requested band by the first wireless communication system is secured.

Effects of the Invention

According to the present disclosure, when a shared band, in which bands used by a first wireless communication system (a primary system) and bands used by a second wireless communication system (a secondary system) overlap with each other, is allocated, by using a comprehensive line control in which a frequency band is preferentially allocated to the primary system and the secondary system secondarily uses an unused band, the secondary system can share the shared band without affecting an operation of the unused band of the primary system.

DESCRIPTION OF EMBODIMENTS

Figure 1:
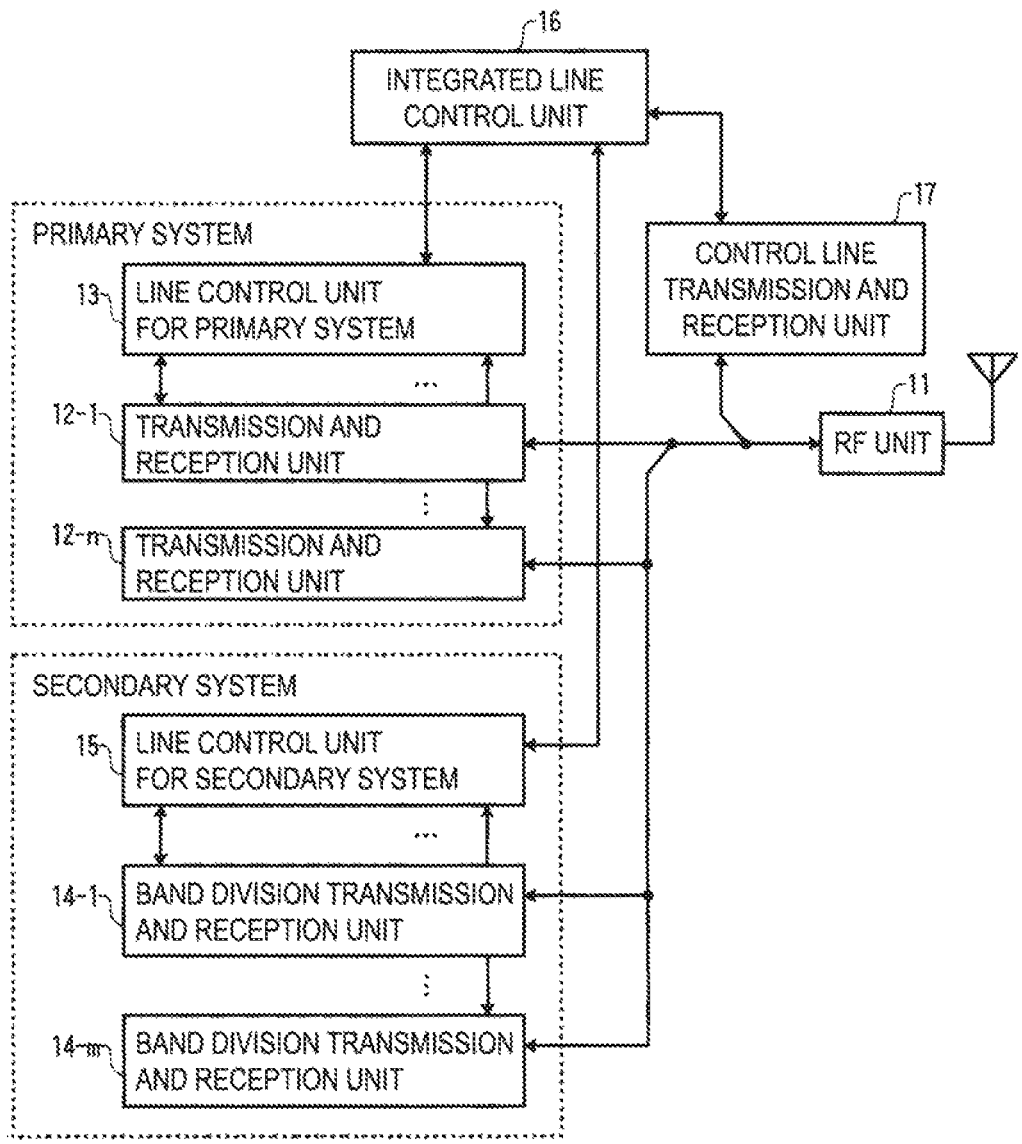
FIG. 1 is a diagram illustrating a configuration example of a base station apparatus including a line control apparatus according to the present disclosure.

FIG. 1 illustrates a configuration example of a base station apparatus including a line control apparatus according to the present disclosure.

In FIG. 1, the base station apparatus includes an RF unit 11 which performs a transmission and reception process of wireless signals on a communication line and a control line, transmission and reception units 12-1 to 12-$n$ which connect to the RF unit 11 to a transmission and reception process on signals of the communication line with a terminal station of a primary system, a line control unit for primary system 13 which controls a band to be allocated to each transmission and reception unit, band division transmission and reception units 14-1 to 14-$m$ which connect to the RF unit 11 to perform a spectrum division and synthesis process and a transmission and reception process on signals of the communication line with the terminal station on the secondary system, a line control unit for secondary system 15 which controls a band to be allocated to each band division transmission and reception unit, an integrated line control unit 16 which performs consolidated band control on the line control unit for primary system 13 and the line control unit for secondary system 15, and a control line transmission and reception unit 17 which processes a control signal transmitted and received on the control line between the RF unit 11 and the integrated line control unit 16.

Figure 13A:
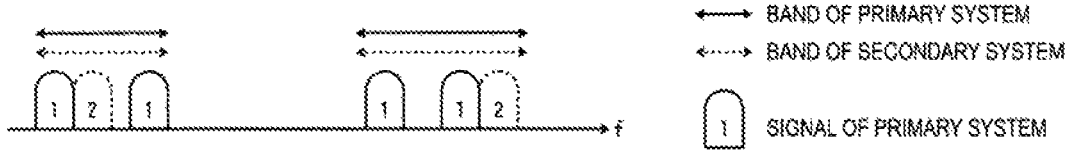
FIG. 13 is a diagram illustrating a band allocation example of a primary system and a secondary system.

As illustrated in FIG. 13, frequency bands to be used by the transmission and reception units 12-1 to 12-$n$ of the primary system and the band division transmission and reception units 14-1 to 14-$m$ of the secondary system may be common, or may be different from each other but there may be a shared band. Further, each transmission and reception unit may contain one terminal station, or may contain a plurality of terminal stations to be configured to correspond to a multiple access. The transmission and reception units 12-1 to 12-$n$ of the primary system and the band division transmission and reception units 14-1 to 14-$m$ of the secondary system may be at least one unit each and can still operate.

Figure 9A:
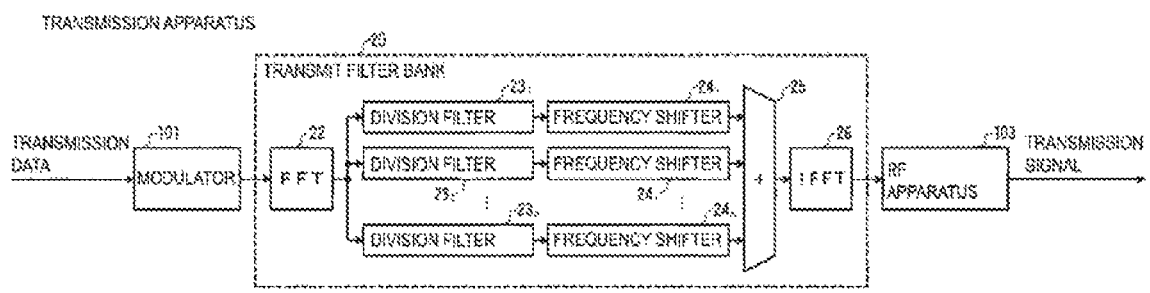
FIGS. 9A and 9B are diagrams illustrating a configuration example of a transmission apparatus and a reception apparatus which perform spectrum division transmission.
Figure 9B:
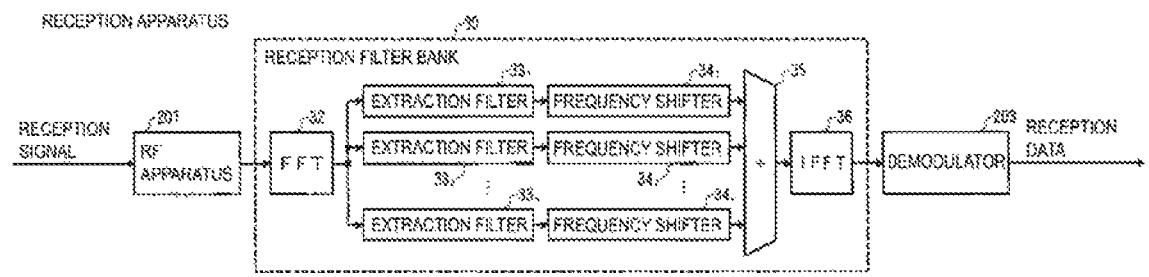
Figure 10A:
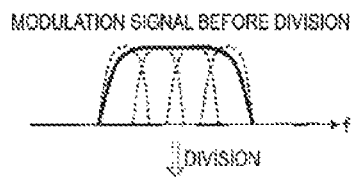
FIGS. 10A to 10F are diagrams illustrating an example of band distribution and band synthesis in spectrum division transmission.
Figure 10D:
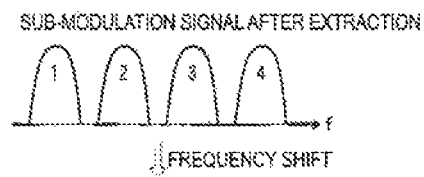
Figure 10B:
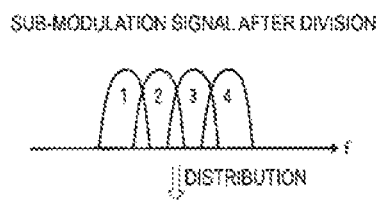
Figure 10E:
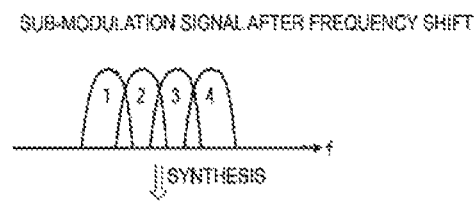
Figure 10C:
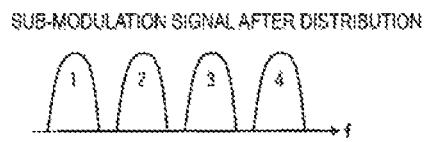
Figure 10F:
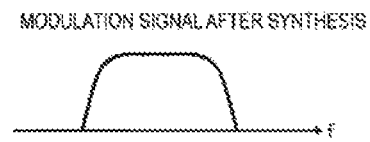
Figure 11:
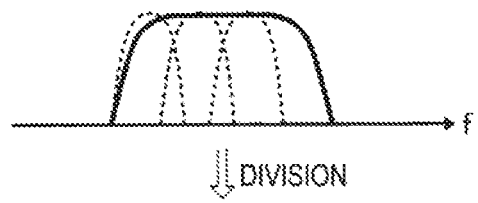
FIG. 11 is a diagram illustrating an example of a spectrum compression transmission.
Figure 11:
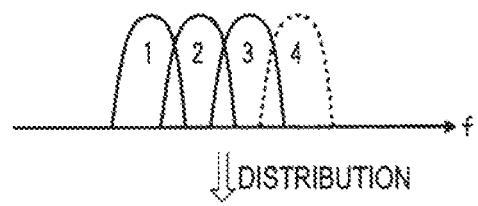
Figure 11:
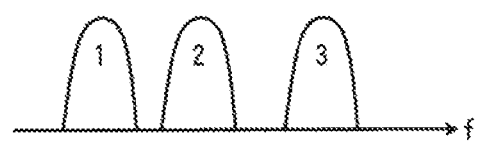
Figure 12:
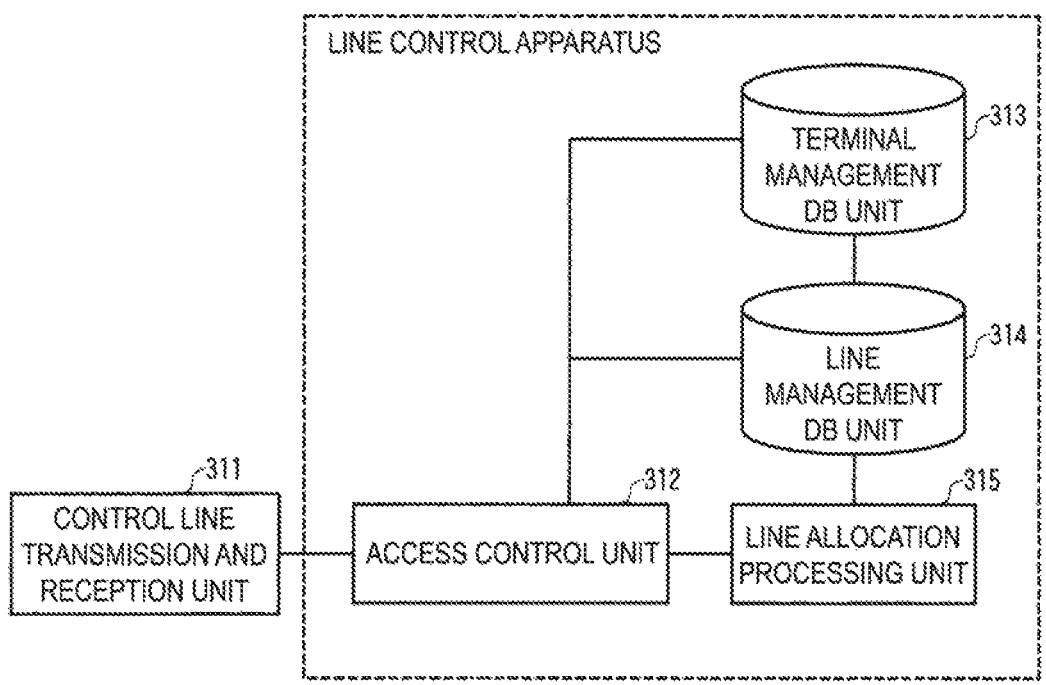
FIG. 12 is a diagram illustrating a configuration example of a line control apparatus of a base station or a line control station.

The band division transmission and reception units 14-1 to 14-$m$ can be configured to include the transmission filter bank 20 and the reception filter bank 30 illustrated in FIGS. 9A and 9B.

A line control apparatus of abase station or a line control station in the related art corresponds to the line control unit for primary system 13 and the line control unit for secondary system 15 illustrated in FIG. 1, but cooperated control between the line control unit for primary system 13 and the line control unit for secondary system 15 is not assumed. Thus, band allocation for the secondary system which performs spectrum division transmission may affect the existing primary system.

A characteristic of the present disclosure is that the integrated line control unit 16 is provided, which consolidates and controls the line control unit for primary system 13 and the line control unit for secondary system 15.

That is, the integrated line control unit 16 according to the present disclosure identifies entire frequency bands used by the primary system and the secondary system, centrally performs management for the frequency bands such as band allocation for a new terminal station, releasing the band used by the terminal station which terminates communication, and checking a use status of the band or evaluating effects of interference, and consolidates and controls the line control unit for primary system 13 and the line control unit for secondary system 15.

This consolidated control is to achieve coexistence with the secondary system which uses spectrum division transmission while prioritizing the primary system, which is an existing system. Continuous bands are preferentially allocated to the primary system. An unused band of the primary system is allocated to the secondary system, and a plurality of scattered unused bands are effectively used by the spectrum division transmission.

The integrated line control unit 16 does not perform control which hinders an operation, such as interruption, a change in allocated frequency and bandwidth during operation of the primary system on the line control unit for primary system 13, except sharing the unused bands of the primary system with the secondary system.

In a case where a fixed bandwidth of the primary system is allocated to the terminal station of the primary system, the terminal station of the primary system does not receive any band other than the allocated band. The band once allocated to the terminal station of the primary system is not readjusted later due to an operational condition of the secondary system, and the terminal station of the primary system operates preferentially with respect to the secondary system. On the other hand, the operation of the terminal station of the secondary system is limited as described below in accordance with the operational status of the primary system.

The line control unit for primary system 13 and the line control unit for secondary system 15 perform the control described above under the integrated line control unit 16. Alternatively, the integrated line control unit 16 may include the functions of the line control unit for primary system 13 and the line control unit for secondary system 15 and the integrated line control unit 16 may configured to directly perform band allocation control for the transmission and reception units 12-1 to 12-n of the primary system and the band division transmission and reception units 14-1 to 14-m of the secondary system. Alternatively, a configuration, in which the integrated line control unit 16 and the line control unit for primary system 13 are integrated or the integrated line control unit 16 and the line control unit for secondary system 15 are integrated, may be provided. A line control management terminal for configuring a parameter such as band allocation may be connected to each of the line control unit for primary system 13, the line control unit for secondary system 15, and the integrated line control unit 16, or may be configured to connect to only the integrated line control unit 16.

Figure 2:
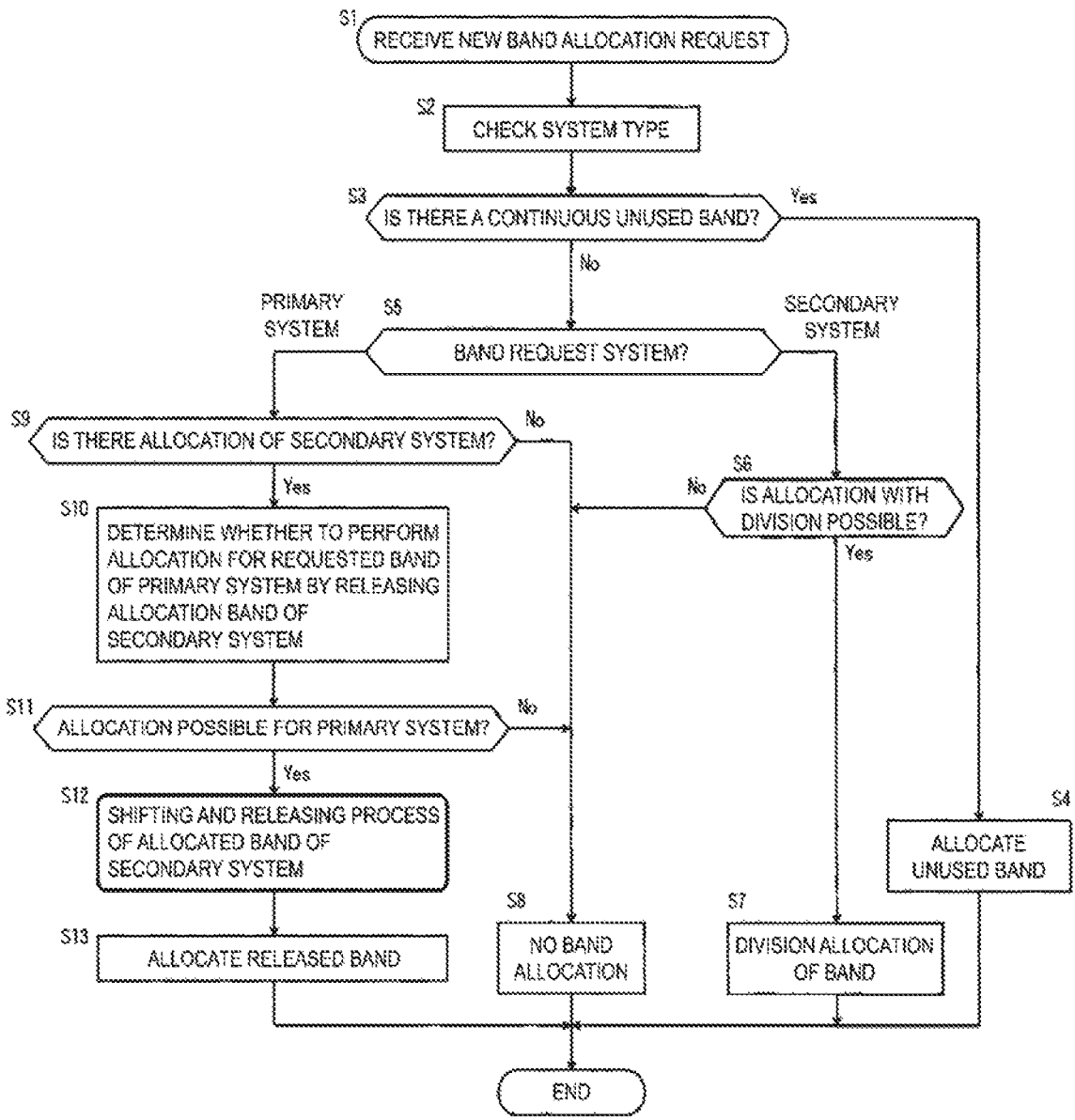
FIG. 2 is a flowchart illustrating a process procedure example of an integrated line control unit 16.
Figure 4:
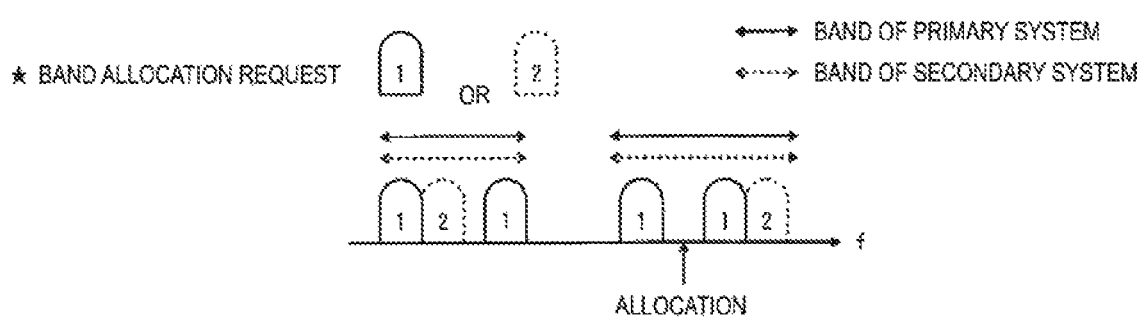
FIG. 4 is a diagram illustrating an allocation example of an unused band in S4.

FIG. 2 illustrates a process procedure example of the integrated line control unit 16. In FIG. 2, when the integrated line control unit 16 receives a new band allocation request that has been received by the RF unit 11 via the control line and has been processed by the control line transmission and reception unit 17 (S1), checks whether the band allocation request is from the terminal station of the primary system or from the terminal station of the secondary system (S2), determines whether there is an available continuous unused band sufficient for the requested band (S3), and allocates the unused band in a case where there is a sufficient unused band in any one of the systems (S4). The description is illustrated in FIG. 4.

On the other hand, in a case where there is no continuous unused band sufficient for the requested band, the following processes are performed depending on whether the band allocation request is from the primary system or the secondary system (S5).

Figure 5:
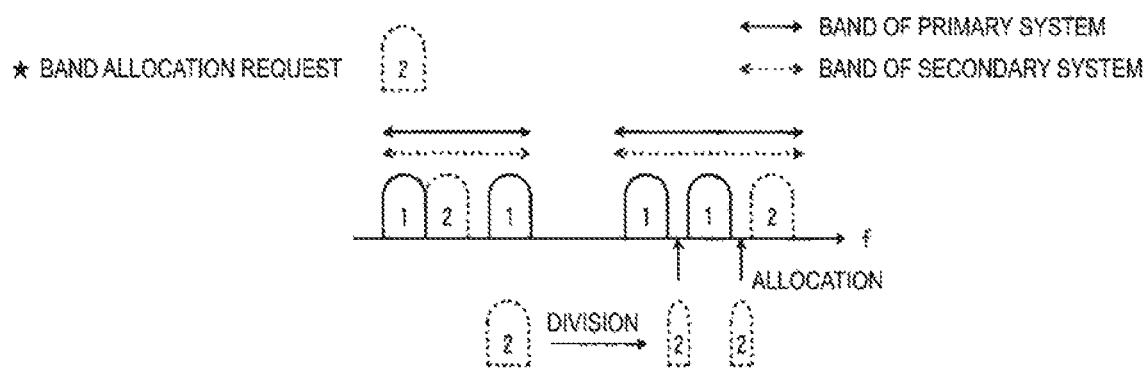
FIG. 5 is a diagram illustrating an example of division and allocation for a band in S7.

In a case where the band allocation request is from the terminal station of the secondary system, it is determined whether allocation can be performed if spectrum division is performed (S6), and the division and allocation of the band are performed if possible (S7). The description is illustrated in FIG. 5. When the allocation cannot be performed even if the spectrum division is performed, the process is terminated without the band allocation in response to the band allocation request (S8).

In a case where the band allocation request is from the terminal station of the primary system, it is determined whether there is a band allocated to the terminal station of the secondary system within the used band (in the shared band) of the primary system (S9). In a case where there is no allocation band of the terminal station of the secondary system, the allocation band of the secondary system cannot be shared and allocated in response to the band allocation request of the primary system, thus the process is terminated without the band allocation (S8).

On the other hand, in a case where there is the band allocated to the terminal station of the secondary system, the band allocated to one or a plurality of terminal stations of the secondary system is released and it is determined whether a continuous band to be allocated for the requested band requested by the primary system can be secured (S10 and S11). In a case where the band of the allocation request from the new terminal station of the primary system is large and the continuous band to be allocated to the terminal station of the primary system cannot be secured even if the band allocated to one or the plurality of terminal stations of the secondary system is released (No in S11), the process is terminated without the band allocation for the primary system (S8).

On the other hand, in a case where the allocated band of one or the plurality of terminal stations of the secondary system is released and a continuous band to be allocated to the terminal station of the primary system can be secured (Yes in S11), the band allocation to the secondary system is shifted and subjected to the releasing process (S12), and the released continuous band is allocated to the terminal station of the primary system (S13).

In step S12, a target terminal station of the secondary system for release of the allocated band to secure a continuous band for a requested band requested by the primary system is preferably minimum necessary. And thus the target terminal station is predetermined in accordance with the band allocated to each terminal station.

The terminal station, to which the band has been allocated but is released, is disconnected. Therefore, if it is possible to shift band allocation to another unused band, it is preferable to perform a shifting process together. The shifting of the band allocation to the terminal station of the secondary system includes a case where it is possible to shift band allocation without band division, a case where it is possible to shift band allocation with the band division, and a case where it is not possible to shift band allocation even with the band division. In a case where it is possible to shift band allocation, band allocation is shifted and the allocated band is released. In a case where it is not possible to shift band allocation, the line of the secondary system is disconnected and the allocated band is released. Details will be described below.

Figure 3:
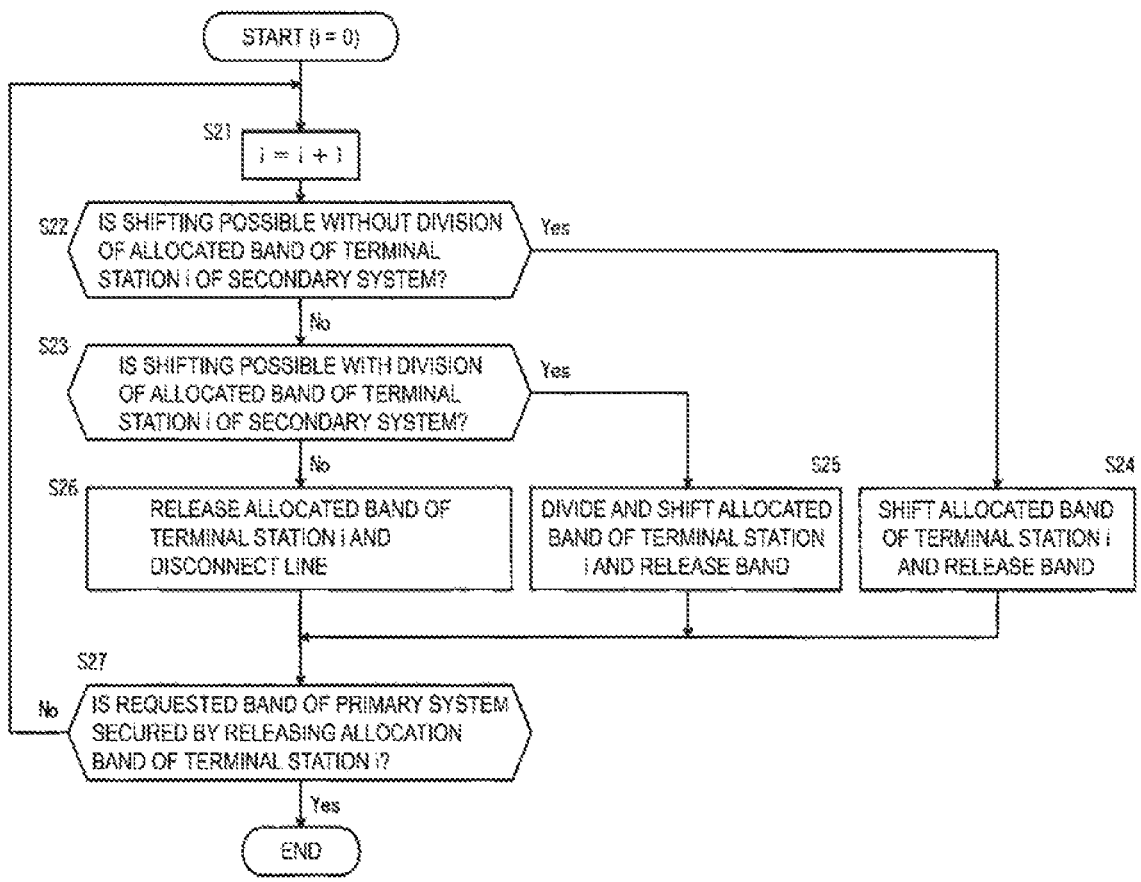
FIG. 3 is a flowchart illustrating a procedure example of a shifting and releasing process S12 of a band allocated to a secondary system.

FIG. 3 illustrates a procedure example of shifting and releasing process S12 of an allocated band of a secondary system.

Figure 6:
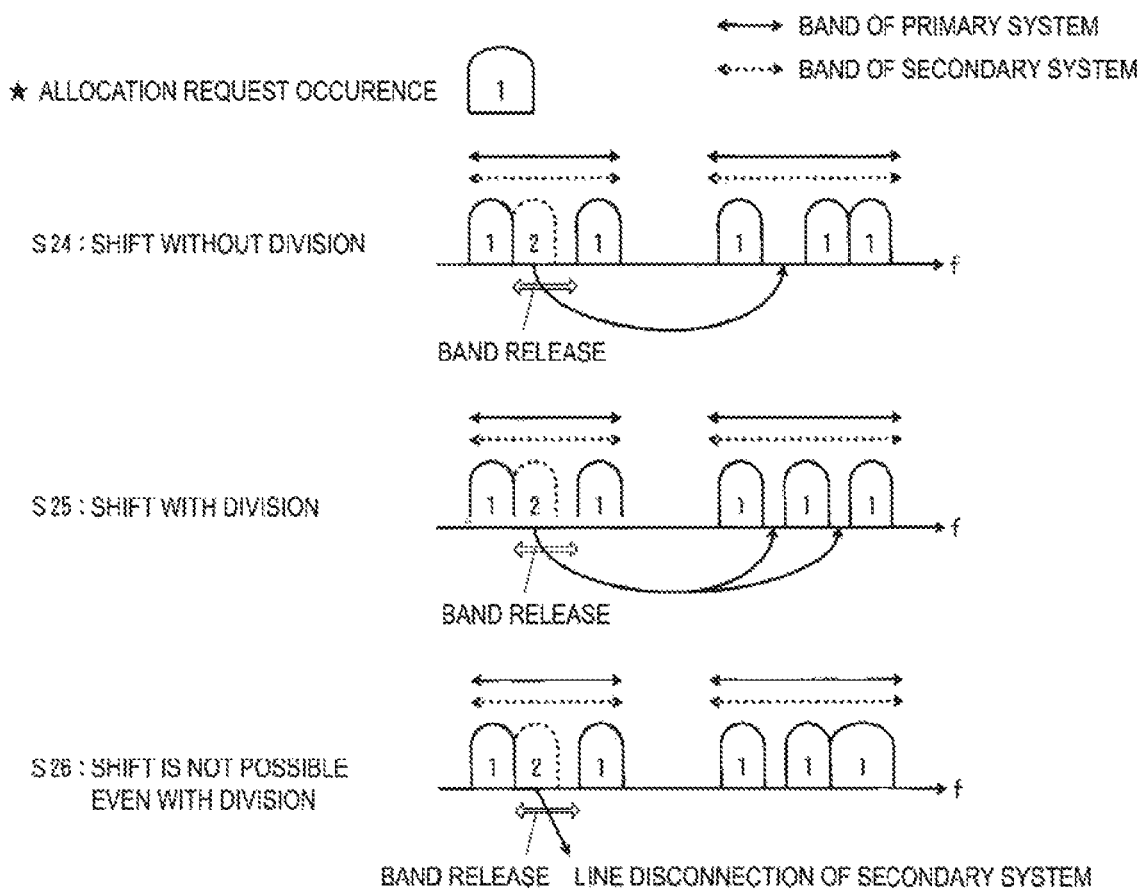
FIG. 6 is a diagram illustrating a released band example in S24, S25, and S26.
Figure 7A:
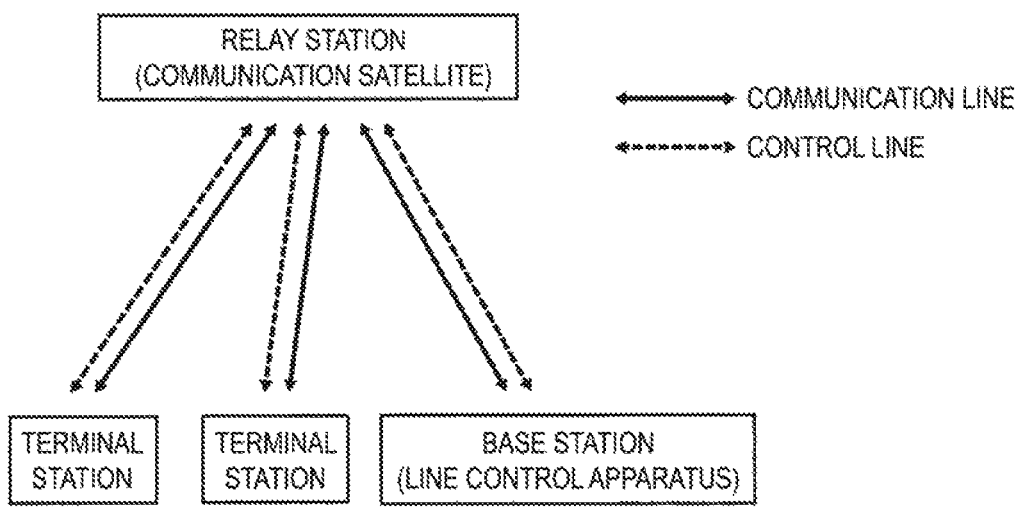
FIGS. 7A and 7B are diagrams illustrating a configuration of a wireless communication system using a communication satellite as a relay station.
Figure 7B:
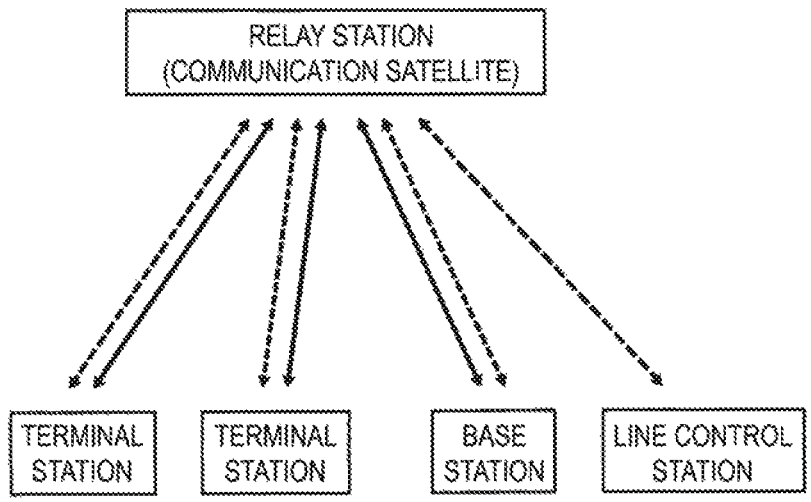
Figure 8:
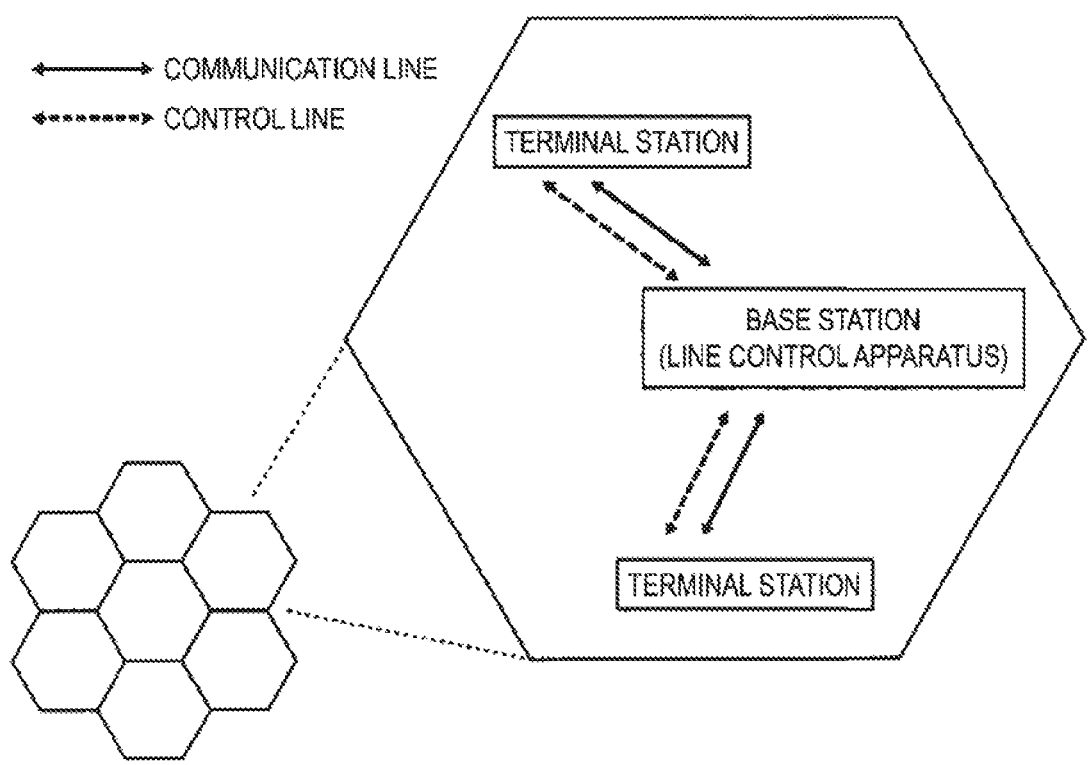
FIG. 8 is a diagram illustrating a configuration of a wireless communication system using a base station as a relay station.

In FIG. 3, a sequence number i is appended to a predetermined target terminal station of the secondary system, where an allocated band of the target terminal station is released. First, i is set to 1 (S21). It is determined whether shifting is possible without the division of the allocated band of the terminal station i of the secondary system, and it is further determined whether shifting is possible when the allocated band of the terminal station i of the secondary system is divided (S22 and S23). In a case where shifting is possible without the division of the allocated band of the terminal station i of the secondary system (Yes in S22), the shifting is performed and the allocated band is released (S24). In a case where shifting is possible when the allocated band of the terminal station i of the secondary system is divided (Yes in S23), the allocated band of the terminal station i is divided and band allocation is shifted, and the allocated band is released (S25). Further, in a case where the band allocation of the terminal station i of the secondary system cannot be shifted even with the division (No in S23), the allocated band of the terminal station i is released, and the line of the secondary system is disconnected (S26). The above description is illustrated in FIG. 6.

The processes in steps S22 to S26 are repeated until a continuous band to be allocated to the request band for the primary system is secured through the release of the allocation band of the terminal station i of the secondary system (S27).

In step S26, even when the band allocation of the terminal station i of the secondary system is divided, but still the band allocation cannot be shifted, the allocated band of the terminal station i is released and the released continuous bands are allocated to the terminal station of the primary system (S13 in FIG. 2). However, in a case where the requested band of the primary system is smaller than the released band, and there is another unused band in addition to the remaining band, the band also may be reallocated to the terminal station i of the disconnected secondary system.

In step S26, in a case where a band that can be shifted is not secured by spectrum division but a band that can be shifted is secured by spectrum compression, the allocation band of the terminal station i may be shifted by the spectrum compression and the band may be released. In the same manner, in steps S6 and S7 in FIG. 2, an allocation request from the terminal station of the secondary system may be handled by the spectrum compression. In addition to the spectrum compression, the band allocation to the secondary system may be performed with reduction of the allocated band through a multi-level modulation scheme and an increase of a coding rate of a coding scheme without deterioration in throughput.

Figure 13B:
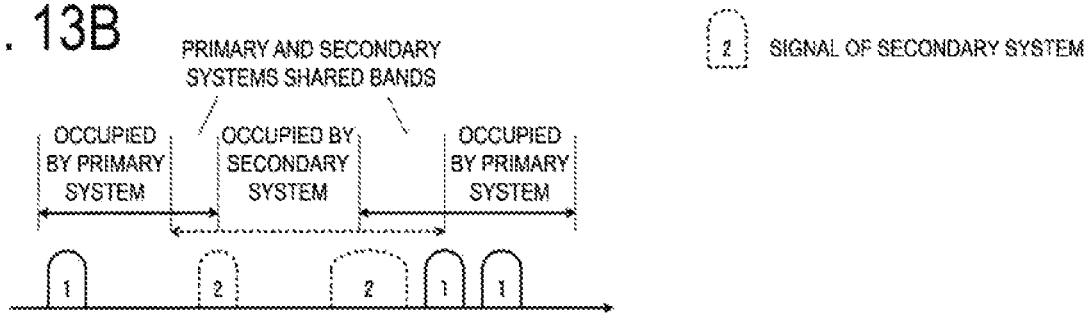

As illustrated in FIG. 13B, an unshared band of the primary system or the secondary system may be set and the unshared bandwidth may be adjusted. For example, there may be a case where a band in the primary and secondary shared bands is supposedly have been released in order to perform band allocation for the primary system, an interference may occur when a terminal station of the secondary system fails and transmits an unwanted wave, or connectivity is not ensured even in the terminal station of the secondary system. However the above processes can reduce a probability of occurrence of these problems by adjusting the unshared bandwidth. By handling a specific secondary system signal in the same manner as the primary system during the band allocation request, connectivity of the secondary system signal may be secured.

In a case where an identical band is shared by a plurality of terminal stations in the primary system and the secondary system, for example, a case where the identical band such as TDMA is time-divided and shared by a plurality of terminal stations or a case where, for a signal of an FDMA scheme, a destination terminal station is selected with an IP packet transmitted, the maximum number of terminal stations sharing the identical band may be considered, and band allocation may be performed such that unused bands after new band allocation are maximized.

When occurrence of interference waves is confirmed by sweeping the frequency band sequentially, in a case of an unused band, the band is set as unavailable, and in a case where there is a terminal station using the band, a band may be reallocated.

The integrated line control unit (16 in FIG. 1) may periodically transmit a health check signal to a terminal station to which the band is allocated via the control line, and in a case where there is no health check response from the terminal station for a preset time t, the band may be released as an unused band and allocated to a new terminal station as the unused band. At the terminal station side, the terminal station may determine that the allocated band is lost in a case where the terminal station receives no health check signal or is not able to respond to the health check signal.

The terminal station of the secondary system may also perform important communication which cannot be disconnected, such as emergency communication. In such a case, control may be performed such that priority of a specific terminal station may be raised to that of the terminal station of the primary system, to avoid line disconnection during the communication.

In the new band allocation request, in a case where a requested band Wd is designated, control may be performed to determine whether band allocation satisfying the requested band can be realized. The requested band is defined as Wd and a total unused band is defined as We, and band allocation cannot be performed in a case of Wd>We. Therefore, the requested band Wd may be adjusted to satisfy the relationship Wd≤We, and the band allocation may be executed again.

The line allocation control described above can be realized by a computer program which causes a computer to function as the integrated line control unit 16, the line control unit for primary system 13, and the line control unit for secondary system 15. The computer program can be provided in a form recorded in a computer-readable storage medium via a network.

REFERENCE SIGNS LIST

11 RF unit
12 Transmission and reception unit
13 Line control unit for primary system
14 Band division transmission and reception unit
15 Line control unit for secondary system
16 Integrated line control unit
17 Control line transmission and reception unit

The invention claimed is:
1. A line control apparatus including a shared band in which a first frequency band used by a first wireless communication system and a second frequency band used by a second wireless communication system overlap with each other and allocating the first frequency band and the second frequency band including the shared band to terminal stations of the respective wireless communication systems, the line control apparatus comprising:

a control unit configured to:
identify a use status of the first frequency band and the second frequency band,
release an allocated band of a terminal station of the second wireless communication system, in a case where a terminal station of the first wireless communication system performs a new band allocation request, wherein the second wireless communication system is configured to perform spectrum division transmission and the first wireless communication system is allocated only continuous frequency bands,
upon receipt of a new band allocation request, check whether the band allocation request is from a terminal station of the first wireless communication system or from a terminal station of the second wireless communication system, determine whether there is a continuous unused band sufficient for the requested band, and allocate the unused band to one or more terminals of the first wireless communication system in a case where there is a sufficient unused band in any one of the first and second wireless communication systems, and
in a case where there is no continuous unused band sufficient for the requested band:
if the band allocation request is from a terminal station of the second system that is configured to perform spectrum division transmission, terminate without performing the band allocation when the band allocation cannot be performed even if the spectrum division transmission is performed; and
if the band allocation request is from a terminal station of the first system that is allocated only continuous bands, determine if a frequency band allocated to one or more terminal stations of the second communication system can be used to create a continuous frequency band and, if so, release the allocated frequency band from the second communication system and allocate a continuous frequency band including at least a portion of the released frequency band to the first communication system.

2. The line control apparatus according to claim 1, wherein,
when the control unit releases the allocated band of the terminal station of the second wireless communication system, in a case where an unused band of the second frequency band is secured, the control unit performs control to shift band allocation to the unused band and release the allocated band, and in a case where no unused band of the second frequency band is secured, the control unit performs control of line disconnection.

3. The line control apparatus according to claim 2,
wherein the second wireless communication system is configured to perform spectrum division transmission including dividing a single-carrier modulation signal into one or more sub-modulation signals and distributing the one or more sub-modulation signals in one or more unused bands, and when the control unit releases the allocated band of the terminal station of the second wireless communication system, in a case where an unused band of the second frequency band is secured by the spectrum division transmission, the control unit performs control to shift band allocation to the unused band and release the allocated band, and in a case where no unused band of the second frequency band is used by the spectrum division, the control unit performs control of line disconnection.

4. A line control method which includes a shared band in which a first frequency band used by a first wireless communication system and a second frequency band used by a second wireless communication system overlap with each other and for allocating the first frequency band and the second frequency band including the shared band to terminal stations of the respective wireless communication systems, the line control method comprising performing of
identification of a use status of the first frequency band and the second frequency band,
release of an allocated band of a terminal station of the second wireless communication system, in a case where a terminal station of the first wireless communication system performs a new band allocation request, wherein the second wireless communication system is configured to perform spectrum division transmission and a primary wireless communication system is allocated only continuous frequency bands,
upon receipt of a new band allocation request, check whether the band allocation request is from a terminal station of the first wireless communication system or from a terminal station of the second wireless communication system, determine whether there is an available continuous unused band sufficient for the requested band, and allocate the unused band to one or more terminals of the first wireless communication system in a case where there is a sufficient unused band in any one of the first and second wireless communication systems, and
in a case where there is no continuous unused band sufficient for the requested band:
if the band allocation request is from a terminal station of the second system configured to perform spectrum division transmission, terminate without performing the band allocation when the band allocation cannot be performed even if the spectrum division transmission is performed; and
if the band allocation request is from a terminal station of the first system that is allocated only continuous bands, determine if a frequency band allocated to one or more terminal stations of the second communication system can be used to create a continuous frequency band and, if so, release the allocated frequency band from the second communication system and allocate a continuous frequency band including at least a portion of the released frequency band to the first communication system.

5. The line control method according to claim 4,
further comprising releasing the allocated band of the terminal station of the second wireless communication system, in a case where an unused band of the second frequency band is used, control of shifting band allocation to the unused band and releasing the allocated band is performed, and in a case where no unused band of the second frequency band is used, control of line disconnection is performed.

6. The line control method according to claim 4,
wherein the second wireless communication system is configured to the perform spectrum division transmission including dividing a single-carrier modulation signal into one or more sub-modulation signals and distributing the one or more sub-modulation signals in one or more unused bands, and when the release occurs of the allocated band of the terminal station of the second wireless communication system in a case where an unused band of the second frequency band is used by the spectrum division, control of shifting band allocation to the unused band and releasing the allocated band is performed, and in a case where no unused band of the second frequency band is used by the spectrum division, control of line disconnection is performed.

7. A non-transitory computer readable medium including instructions executable by one or more processors to:
identifying a use status of a first frequency band and a second frequency band, where a shared band in which the first frequency band used by a first wireless communication system and the second frequency band used by a second wireless communication system overlap with each other and for allocating the first frequency band and the second frequency band including the shared band to terminal stations of the respective wireless communication systems,
releasing of an allocated band of a terminal station of the second wireless communication system in a case where a terminal station of the first wireless communication system performs a new band allocation, wherein the second wireless communication system is configured to perform spectrum division transmission and a primary wireless communication system is allocated only continuous frequency bands, and
upon receipt of a new band allocation request, checking whether the band allocation request is from a terminal station of the first wireless communication system or from a terminal station of the second wireless communication system, determine whether there is an available continuous unused band sufficient for the requested band, and allocate the unused band to one or more terminals of the first wireless communication system in a case where there is a sufficient unused band in any one of the first and second wireless communication systems, and
in a case where there is no continuous unused band sufficient for the requested band:
if the band allocation request is from a terminal station of the second system that performs spectrum division transmission, terminate without performing the band allocation when the band allocation cannot be performed even if the spectrum division transmission is performed; and
if the band allocation request is from a terminal station of the first system that is allocated only continuous bands, determine if a frequency band allocated to one or more terminal stations of the second communication system can be used to create a continuous frequency band and, if so, release the allocated frequency band from the second communication system and allocate a continuous frequency band including at least a portion of the released frequency band to the first communication system.

* * * * *